(No Model.)

C. C. HEBBARD.
CAR SPRING.

No. 290,582. Patented Dec. 18, 1883.

WITNESSES
F. L. Durand
John D. Suter Jr.

INVENTOR
C. C. Hebbard
F. A. Fouts
Attorney

UNITED STATES PATENT OFFICE.

CHARLES C. HEBBARD, OF KNOXVILLE, TENNESSEE.

CAR-SPRING.

SPECIFICATION forming part of Letters Patent No. 290,582, dated December 18, 1883.

Application filed October 13, 1883. (No model.)

*To all whom it may concern:*

Be it known that I, CHARLES C. HEBBARD, a citizen of the United States, residing at Knoxville, in the county of Knox and State of Tennessee, have invented certain new and useful Improvements in Car-Springs, of which the following is a specification, reference being had therein to the accompanying drawings.

My invention relates to car-springs; and it consists in the parts which will be hereinafter described, and pointed out in the claims.

Figure 1:
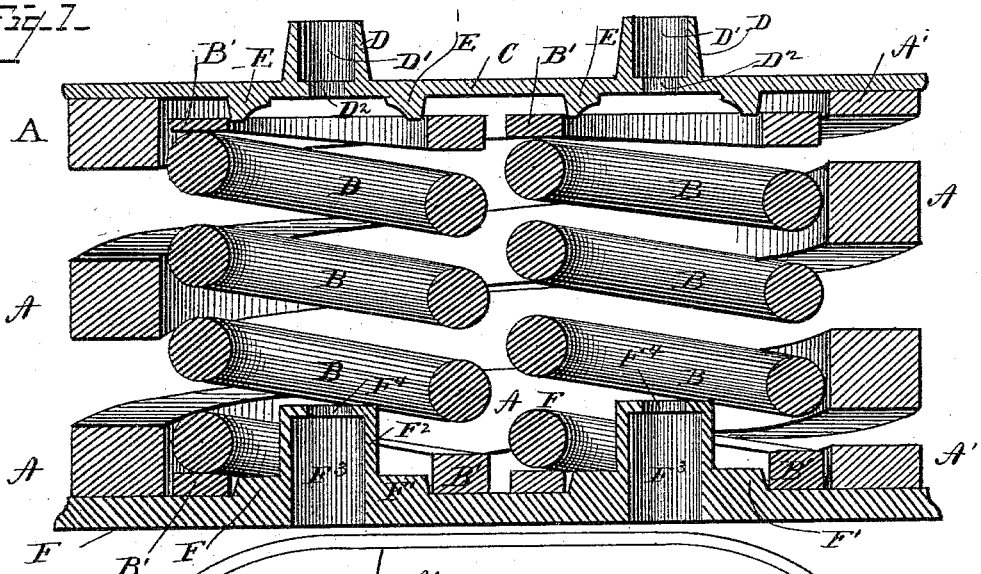
Figure 2:
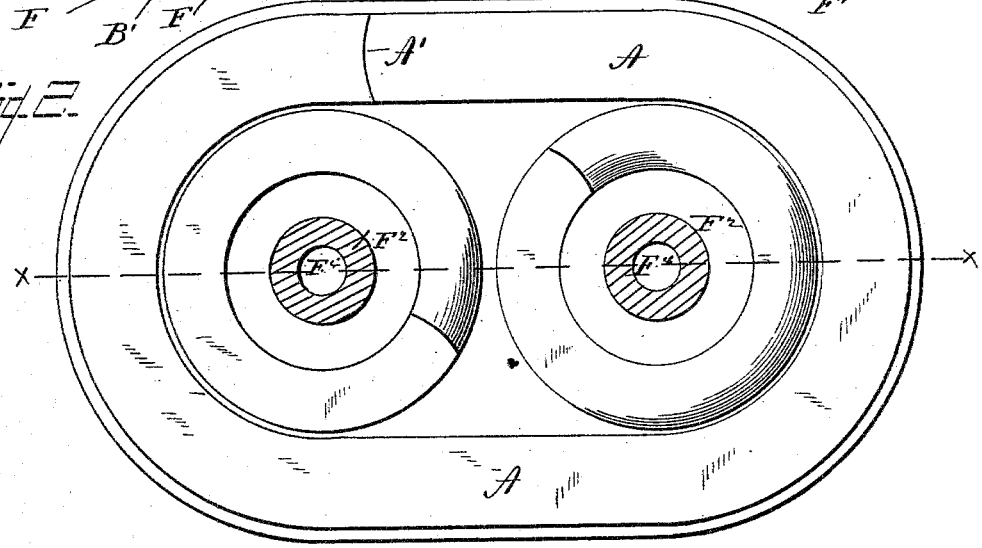

In the accompanying drawings, Figure 1 represents a longitudinal section on the line $x$ $x$ of Fig. 2. Fig. 2 is a plan view of the outside elliptical coil-spring and the two circular spiral springs within the ellipse. In this view the top casting is removed, to show the position of the springs.

Like letters indicate like parts in the several views.

The letter A represents the elliptical outside coil-spring, having tapering ends A', that lie against the inner sides of the top and bottom plates, respectively.

B B are the two circular spiral springs within the ellipse. (Shown in Figs. 1 and 2.)

B' are the flat ends, top, and bottom, which lie against the inner sides of the upper and lower plates, respectively.

C is the top plate, provided with socket-rims D. Said rims have sockets D', which communicate with smaller openings $D^2$ through the plate C. There are two of these rims on the plate C, each identical in construction and function.

E is one of two circular flanges on the under side of the top plate. These flanges fit between the tapering upper sides of the circular springs B, and serve to hold said springs in a fixed relative position, thereby preventing lateral play.

F is the bottom plate, provided with inside circular pieces, F', upon which are mounted cylindrical caps $F^2$. Said caps have sockets $F^3$ and openings $F^4$. The circular piece F' serves the same functions for the bottom of the concentric springs that the circular flanges E do for the upper part of said spring—that is to say, the circular springs encircle the peripheries of the pieces F', thereby holding the lower ends of the springs in a fixed position on the plate F.

G is an elliptical coil-spring (shown in Fig. 3) within the outer elliptical spring, A.

G' is the flat upper end of spring G.

H is a smaller elliptical coil-spring within the ellipse of spring G, and H' is the tapered end thereof. The opening $D^2$ in the upper plate and opening $F^4$ in the crown of the cylindrical cap $F^2$ are aligned, and adapted to admit a rod or bolt, to secure the plates C F firmly against the springs. The sockets D' and $F^3$ are adapted to receive a bolt-head or nut on the end of a tie-rod, and permit the vertical play of said bolt-head or nut therein, to conform to the vibration of the plates incident to the compression and expansion of the springs.

The arrangement and construction of the springs herein shown and described insure a slow, soft, and easy motion, that cannot be obtained in springs composed wholly of concentric spirals.

In making a nest of elliptical springs, as shown in Fig. 3, I prefer to coil them alternately right and left, also to make the inner coils smaller and shorter than the outside coils. The object of this is to permit the large outside coil to carry the empty car and light load, leaving the inside coils to come in play when the car becomes heavily loaded.

The spirals B (shown in Fig. 1) are shorter than the outside elliptical spring, whereby said elliptical spring receives the weight of empty car and light load, thus reserving the inner spirals for use when the car is heavily loaded.

The elliptical springs can be made of a bar or bars of steel, and formed either round, flat, oval, grooved, fluted, or edge-rolled.

Having thus described my invention, I claim as new and desire to secure by Letters Patent—

1. In a car-spring, an elliptical coil-spring, in combination with one or more circular coil-springs, said circular coil-springs being within the coils of the elliptical springs, substantially as described, and for the purpose set forth.

2. In a car-spring, an elliptical coil-spring having one or more spiral springs within it, said spiral springs being shorter than the outside elliptical springs, substantially as described, and for the purpose set forth.

In testimony whereof I affix my signature in presence of two witnesses.

CHARLES C. HEBBARD.

Witnesses:
R. VAN GILDER,
A. H. HEBBARD.